(12) United States Patent
Pradas et al.

(10) Patent No.: US 10,338,572 B2
(45) Date of Patent: Jul. 2, 2019

(54) METHODS, NETWORK NODE AND WIRELESS DEVICE FOR HANDLING DEVICE CAPABILITIES

(71) Applicant: Telefonaktiebolaget LM Ericsson (publ), Stockholm (SE)

(72) Inventors: Jose Luis Pradas, Stockholm (SE); Icaro L. J. da Silva, Bromma (SE); Gunnar Mildh, Sollentuna (SE); Johan Rune, Lidingö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 147 days.

(21) Appl. No.: 15/315,653

(22) PCT Filed: Nov. 2, 2015

(86) PCT No.: PCT/SE2015/051152
§ 371 (c)(1),
(2) Date: Dec. 1, 2016

(87) PCT Pub. No.: WO2017/078580
PCT Pub. Date: May 11, 2017

(65) Prior Publication Data
US 2017/0285621 A1    Oct. 5, 2017

(51) Int. Cl.
*G05B 19/418*    (2006.01)
*H04W 76/10*    (2018.01)
(Continued)

(52) U.S. Cl.
CPC ......... *G05B 19/4185* (2013.01); *G06F 9/547* (2013.01); *G06F 15/17381* (2013.01);
(Continued)

(58) Field of Classification Search
None
See application file for complete search history.

(56) References Cited

U.S. PATENT DOCUMENTS 8,989,807 B2 * 3/2015 Schmidt ................. H04W 4/90
455/552.1
9,154,360 B2 * 10/2015 Mariblanca-Nieves ......................
H04L 29/06
(Continued)

FOREIGN PATENT DOCUMENTS

EP    2582117 A1    4/2013
WO    2009041878 A1    4/2009

OTHER PUBLICATIONS

3GPP, "3rd Generation Partnership Project; Technical Specification Group Radio Access Network; Evolved Universal Terrestrial Radio Access (E-UTRA); User Equipment (UE) radio access capabilities (Release 12)", 3GPP TS 36.306 V12.6.0, Sep. 2015, 1-45.
(Continued)

*Primary Examiner* — Joshua Joo
(74) *Attorney, Agent, or Firm* — Sage Patent Group

(57) ABSTRACT

A network node (200), a wireless device (202) and methods therein, for handling device capabilities. The wireless device (202) sends (2:1) a capability pointer to the network node (200), which capability pointer is associated with a capability configuration of the wireless device (202). The network node (200) then retrieves (2:2) said capability configuration based on the capability pointer from a capability database (204) or the like where a range of predefined capability configurations and associated capability pointers are maintained. The retrieved capability configuration can then be used in radio communication (2:3) with the wireless device (202).

24 Claims, 4 Drawing Sheets

(51) Int. Cl.
*H04W 8/22* (2009.01)
*G06F 9/54* (2006.01)
*G06F 15/173* (2006.01)
*H04L 12/24* (2006.01)
*H04L 12/733* (2013.01)
*H04W 24/06* (2009.01)

(52) U.S. Cl.
CPC .......... *H04L 41/046* (2013.01); *H04L 45/122* (2013.01); *H04W 8/22* (2013.01); *H04W 24/06* (2013.01); *H04W 76/10* (2018.02)

(56) References Cited

U.S. PATENT DOCUMENTS

| | | | | |
|---|---|---|---|---|
| 2003/0236892 A1* | 12/2003 | Coulombe | .......... | H04L 67/2823 709/228 |
| 2004/0203648 A1* | 10/2004 | Wong | ....................... | H04W 4/18 455/414.1 |
| 2005/0096016 A1* | 5/2005 | Tervo | ...................... | H04L 67/16 455/414.1 |
| 2007/0130331 A1* | 6/2007 | Kao | .......................... | G06F 8/65 709/224 |
| 2009/0011783 A1* | 1/2009 | Kitazoe | ................... | H04W 8/22 455/517 |
| 2009/0111467 A1* | 4/2009 | Chai | ....................... | H04L 41/00 455/435.1 |
| 2010/0215005 A1* | 8/2010 | Pradas | ................ | H04W 74/006 370/329 |
| 2011/0319085 A1* | 12/2011 | Ishii | ....................... | H04W 88/06 455/436 |
| 2012/0008534 A1* | 1/2012 | Lipford | ................... | H04W 8/24 370/310 |
| 2014/0098756 A1* | 4/2014 | Tabatabaei Yazdi | ........................ | H04W 76/10 370/329 |
| 2015/0163131 A1* | 6/2015 | Bauer | ..................... | H04L 45/44 709/223 |
| 2015/0201179 A1* | 7/2015 | Bouazizi | ............. | H04L 65/4092 348/43 |
| 2016/0112890 A1* | 4/2016 | Kim | ..................... | H04B 7/0413 370/252 |

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)", 3GPP TS 36.300 V13.1.0, Sep. 2015, 1-254.

* cited by examiner

METHODS, NETWORK NODE AND WIRELESS DEVICE FOR HANDLING DEVICE CAPABILITIES

TECHNICAL FIELD

The present disclosure relates generally to a network node, a wireless device and methods therein, for handling capabilities of the wireless device to be used in radio communication with the network node.

BACKGROUND

For some years, different types of radio networks for wireless communication have been developed to provide radio access for various wireless devices. The radio networks are constantly improved to provide better coverage and capacity to meet the demands from subscribers using increasingly advanced services and devices such as smartphones and tablets, which may require considerable amounts of bandwidth and resources for data transport in the networks. A limiting factor for capacity of a radio network is the amount of available radio resources, e.g. in terms of time, frequency bandwidth and transmit power. The capacity of a radio network can be improved by utilizing any available radio resources as efficiently as possible, e.g. by reducing or minimizing the amount of signaling between the devices and the network in order to use the radio resources for communication of payload data and any mandatory messages.

In this disclosure, the term "wireless device" is used to represent any communication entity capable of radio communication with a radio network by sending and receiving radio signals, such as e.g. mobile telephones, tablets, laptop computers and so-called Machine-to-Machine, M2M, devices. Another common generic term in this field is "User Equipment, UE" which could also be used instead of wireless device. Further, the term "network node", is used herein to represent any node of a radio network that is operative to communicate radio signals with wireless devices, or to control some network entity having radio equipment for receiving/transmitting the radio signals. The network node in this disclosure could also be referred to as a base station, radio node, e-NodeB, eNB, NB, base transceiver station, access point, etc., depending on the type of network and terminology used.

When a wireless device is connected to a network node of a radio network, the network node needs information about capabilities of the wireless device, so as to be able to configure and schedule the wireless device in a suitable manner such that the device will operate properly and efficiently. For example, certain features, functions and parameter settings are only possible to use in a radio communication if the wireless device is capable of handling and using those features, functions and parameter settings. It is therefore required that the wireless device provides its capabilities to the network node before a radio communication can be executed. Procedures have been defined for providing such device capabilities to the network.

FIG. 1 illustrates a simple example of how this is basically done when a wireless device 100 communicates with a network node 102 of a radio network over a radio interface and performs an attachment procedure. A node called Mobility Management Entity, MME, 104 is also shown in this example which is a node defined for Long Term Evolution, LTE, networks. The MME node 104 typically maintains various information about wireless devices present in the network such as temporary identities and device capabilities, among other things.

A first action 1:1 illustrates a procedure for establishing a connection between the wireless device 100 and the network node 102, often referred to as network attachment, which typically involves several messages communicated back and forth, as schematically illustrated by multiple two-way arrows. These messages depend on the type of network and protocols used, and may e.g. relate to synchronization, random access, Radio Resource Control (RRC), regulation of transmit power and other radio parameters, and so forth. The MME node 104 is typically involved for transfer of RRC information in this establishment procedure, as schematically illustrated by some further dashed two-way arrows.

Once the radio connection has been established, the network node 102 sends a capability enquiry to the wireless device 100, in a further action 1:2, in order to acquire knowledge about what functions, features and parameters the device 100 is capable of using in the forthcoming radio communication. In response thereto, the wireless device 100 sends its device capabilities to the network node 102 in a further action 1:3. The network node 102 may then accordingly forward a so-called capability information indication, to the MME node 104 in a further action 1:4.

The network node 102 may also acquire the device capabilities of the wireless device 100 after handover completion, i.e. when the device 100 has been handed over from a source network node to the target network node 102, or at state transition from idle to connected state. In either case, at least actions 1:2 and 1:3 may be performed here as well. Alternatively, if the capabilities of the wireless device 100 have been stored previously in the MME node 104, the network node 102 may be able to retrieve them therefrom. A next action 1:5 illustrates that the network node 102 configures and/or schedules the wireless device 100 for radio communication in accordance with the received device capabilities, and the radio communication is conducted in an action 1:6.

Some examples of device capabilities that are typically provided to the network, e.g. as shown in FIG. 1, include various parameters for radio access e.g. related to different protocols, Radio Frequency (RF), signal measurements, and so forth. The device capabilities may also include information about a range of supported features which may be optional or conditionally mandatory. For such a feature, the capability information also indicates whether the feature has been implemented and successfully tested. For LTE networks, the device capabilities are described in more detail in the 3GPP specification TS 36.306, version 12.6.0.

It is a common practice that device capabilities will only indicate that a function or feature is supported if it has been successfully tested in at least two different radio networks. It is thus not possible to know whether the function or feature is supported by the wireless device in a specific network unless the function has been tested for the device in that network and in another network. The above practice may thus require that network operators coordinate deployment of functions and features in order to have them indicated as supported in the device capabilities which is needed to put the functions and features into practice. This means that a network vendor cannot typically release or activate a feature until a UE indicates support in its capabilities, i.e. after the feature has been tested with yet another network. Thus, the NW vendor needs to wait at least for another NW vendor to implement the same feature. It is therefore a problem that certain features cannot be implemented in one particular network, e.g. to address a certain market or group of users, without being also implemented in another network, and that such features would therefore not be marked as supported in the device capabilities such that they will consequently not be activated for that device in the network.

It is also a problem that even if a particular function or feature has been activated in the device capabilities, i.e. when marked as being supported by the device, a fault or problem may sometimes still be found which occurs when trying to use the function or feature. As a result, the network node may employ this function or feature in the radio communication, since it is supported according to the device capabilities, but not with successful or expected outcome.

Another problem is that considerable amounts of radio resources are used whenever a wireless device sends its capabilities to a serving network node. The quantity of capabilities that needs to be provided to the network may thus be quite extensive and is also expanding over time as more capabilities are added to support newly introduced services, functions and features. As a result, interference is also potentially generated in the network when a capability configuration is transmitted over radio. If there are errors in the reception of the full capability configuration, it may even have to be re-transmitted until it is received correctly by the network node, thus consuming additional radio resources and generating further interference in the network.

SUMMARY

It is an object of embodiments described herein to address at least some of the problems and issues outlined above. It is possible to achieve this object and others by using a network node, a wireless device and methods therein as defined in the attached independent claims.

According to one aspect, a method is performed by a network node of a radio network, for handling capabilities of a wireless device. In this method, the network node obtains a capability pointer associated with a capability configuration comprising capabilities of the wireless device. For example, the capability pointer, or an indication thereof, may be received from the wireless device during establishment of a connection with the wireless device or in response to a capability enquiry. The network node then retrieves said capability configuration based on the capability pointer, and uses the retrieved capability configuration in radio communication with the wireless device.

Thereby, the network node can use the capability pointer as a "key" to retrieve the full capability configuration from a capability database that can be accessed by the network node and other network nodes. The capability database may thus hold any number of predefined capability configurations which are associated with respective capability pointers that can be used by wireless devices to signal their device capabilities instead of signaling the complete capability configuration which typically contains a considerable amount of information. Each capability configuration in the capability database may comprise any number of functions and features which are indicated as being supported by any wireless device that signals the associated capability pointer. The signaling from the wireless device over radio is thereby considerably reduced as compared to signaling the complete capability configuration. Further advantages will be explained later below.

According to another aspect, a network node is arranged to handle capabilities of a wireless device. The network node is configured to obtain a capability pointer associated with a capability configuration comprising capabilities of the wireless device. The network node is further configured to retrieve said capability configuration based on the capability pointer, and to use the retrieved capability configuration in radio communication with the wireless device.

According to another aspect, a method is performed by a wireless device for handling capabilities in radio communication with a network node of a radio network. In this method the wireless device sends an indication of a capability pointer to the network node, the capability pointer being associated with a capability configuration comprising capabilities of the wireless device. Thereby, the network node is enabled to retrieve said capability configuration based on the capability pointer, e.g. in the manner outlined above. The indication sent from the wireless device may be the capability pointer itself or it may comprise device information from which the capability pointer can be determined, to be described later below.

According to another aspect, a wireless device is arranged to handle capabilities in radio communication with a network node of a radio network. The wireless device is configured to send an indication of a capability pointer to the network node, the capability pointer being associated with a capability configuration comprising capabilities of the wireless device, thereby enabling the network node to retrieve said capability configuration based on the capability pointer.

The above network node, wireless device and methods may be configured and implemented according to different optional embodiments to accomplish further features and benefits, to be described below.

BRIEF DESCRIPTION OF DRAWINGS

The solution will now be described in more detail by means of exemplary embodiments and with reference to the accompanying drawings, in which.

DETAILED DESCRIPTION

Figure 1:
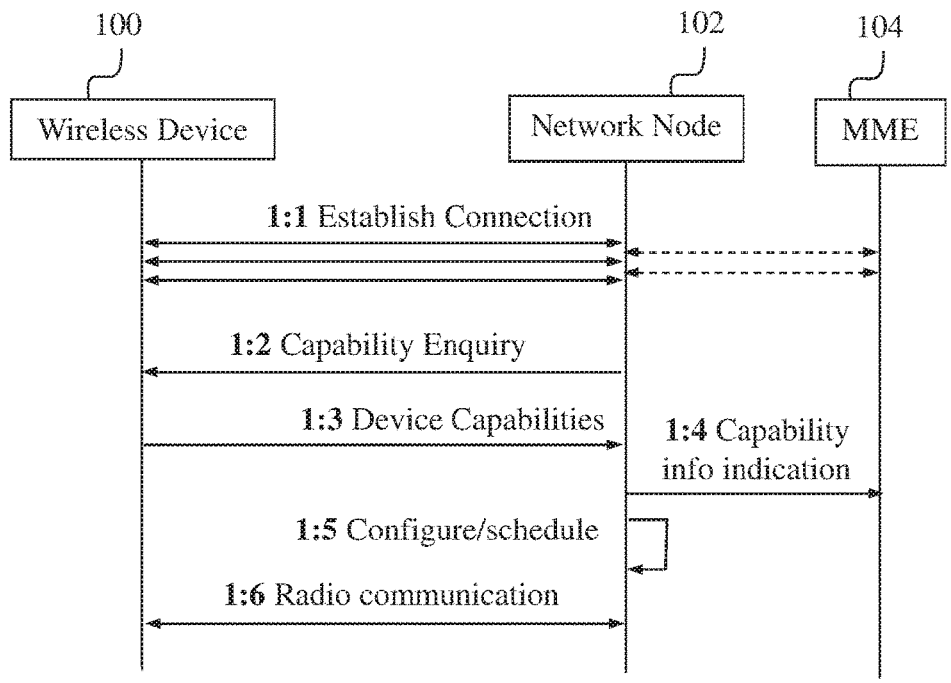
FIG. 1 is a signaling diagram illustrating how device capabilities are provided, according to the prior art.

Briefly described, a solution is provided that can be used to achieve improved flexibility and efficiency when handling capabilities of a wireless device, while also significantly reducing the amount of signaling when the capabilities of a wireless device are acquired by a network node serving the wireless device. It was mentioned above that a wireless device needs to signal its capabilities over a radio interface to a serving network node, before a radio communication can be conducted based on those device capabilities. The wireless device may be required to perform such signaling, e.g. whenever a connection is established between the wireless device and the network node such as after power on or at handover. It was also mentioned that the device capabilities typically comprises large amounts of information, e.g. regarding whether various functions and features are supported, thus requiring considerable amounts of radio resources to convey to the network node.

This signaling is drastically reduced by conveying a capability pointer, or some indication thereof which will be described later below, over the radio interface to the currently serving network node. The capability pointer is associated with a predefined capability configuration indicating various capabilities of the wireless device. The capability pointer can be encoded by just a few bits, in contrast to the full capability configuration valid for the device which requires a much larger number of bits. Thereby, the network node is able to use the capability pointer as a "key" to retrieve the full capability configuration from a capability database, typically over a fixed communication link with virtually no capacity limits. The capability database may be maintained either locally by the network node or centrally at some entity, implemented in the network or elsewhere, that can be accessed by the network node and other network nodes.

The capability database may thus hold a range of different predefined capability configurations which are associated with respective capability pointers that can be used by wireless devices to signal their device capabilities. Each capability configuration in the capability database may comprise any number of functions and features which are indicated as being supported by any wireless device that signals the associated capability pointer, and there is virtually no limit to the amount of information that can be included in a capability configuration. An example of how such a capability database could be organized will be described later with reference to FIG. 6.

The solution outlined above has several advantages over the conventional procedure where the full capability configuration is signaled over the radio interface as described in the background section above. Firstly, by signaling the brief capability pointer instead of the full capability configuration, precious radio resources are saved in the radio network which are thereby available for other communication of data and signaling, thus improving capacity and performance in the network. It is also an advantage that the number of bits for encoding the capability pointer itself can remain the same, i.e. be constant, regardless of how much functions and features are supported by the device and thus regardless of the size of the corresponding full capability configuration which may increase over time without affecting the capability pointer size.

Secondly, any interference generated in the network when signaling a full capability configuration over radio can be avoided or at least greatly reduced by using the embodiments described herein, likewise improving capacity and performance in the network.

Thirdly, the predefined capability configurations in the capability database can easily be maintained and updated in any fashion whenever needed, e.g. when new functions and features are introduced for the wireless devices, which can be valid for multiple devices at the same time, thus providing high flexibility and efficiency. As a result, the time-to-market of a new feature can be greatly reduced since this feature can be indicated as being tested by the serving network and it is not necessary that the feature has been tested by other networks.

Fourthly, by maintaining capability information for specific devices in the capability configurations, the network can easily distinguish those devices that are properly working from faulty devices having problems regarding some feature or function by indicating whether the feature or function is supported or not, respectively. Thereby, it is also able to identify devices whose problems have been patched or fixed. This allows the functioning devices to be handled and served accordingly, as well as finding work-around solutions for those individual devices that have problems.

Figure 2:
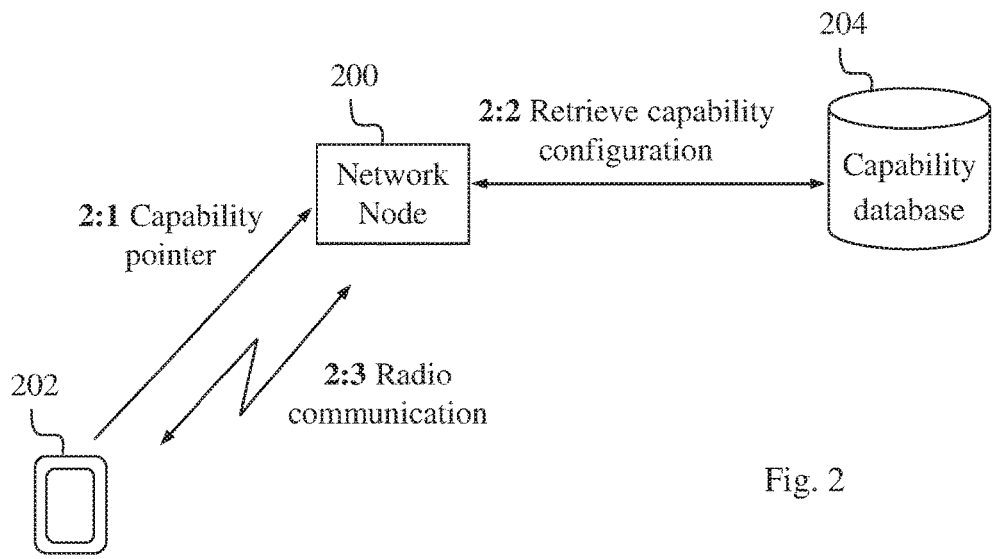
FIG. 2 is a communication scenario illustrating an example of how the solution may be employed, according to some possible embodiments.

A simplified but illustrative example of how the solution may be put to practice, will now be described with reference to FIG. 2 where a network node 200 of a radio network is serving a wireless device 202. A first action 2:1 illustrates that the wireless device 202 sends a capability pointer, or an indication thereof, to the network node 200 over a radio interface. The network node 200 may receive the capability pointer in this action during a procedure for network attachment or after being handed over from a previously serving network node, not shown. The network node 200 may also receive the capability pointer or indication thereof in response to a capability enquiry transmitted to the wireless device 202, e.g. during network attachment or other occasion.

The capability pointer is associated with a capability configuration that is valid for the wireless device 202. It is thus assumed that the wireless device 202 has been configured with this capability pointer in accordance with current capabilities of the wireless device 202. The device capabilities may for example indicate whether the device 202 supports certain functions and features, among other things. It is thus not necessary that the complete capability configuration is maintained in the wireless device, it only needs to be configured with the capability pointer.

In a following action 2:2, the network node 200 retrieves the capability configuration of the wireless device 202, based on the capability pointer received from wireless device 202. In this action 2:2, the network node 200 retrieves the capability configuration from a capability database 204 or the like where a range of predefined capability configurations and associated capability pointers are maintained. The capability database 204 may reside at any location, as mentioned above, and the solution is not limited in this respect. For example, database 204 may be implemented locally at the network node 200 or in a more central entity in the radio network or other location that can be accessed by the network node 200. The retrieved capability configuration can then be used in a radio communication between the network node 200 and the wireless device 202, as shown in another action 2:3.

An example of how the solution may be employed in terms of actions in a procedure performed by a network node for handling capabilities of a wireless device, will now be described with reference to the flow chart in FIG. 3. This procedure can thus be used to accomplish the functionality described above, and some possible but non-limiting embodiments will also be described. The network node and the wireless device in this example correspond to the network node 200 and the wireless device 202, respectively, of FIG. 2.

A first action 300 illustrates that the network node obtains a capability pointer associated with a capability configuration comprising capabilities of the wireless device. This action thus corresponds to action 2:1 above. In some possible embodiments, obtaining the capability pointer may comprise receiving the capability pointer from the wireless device during establishment of a connection with the wireless device or in response to a capability enquiry transmitted to the wireless device.

In another possible embodiment, the network node may obtain the capability pointer by receiving an indication of the capability pointer from the wireless device which indication comprises device information pertaining to the wireless device. The device information in this indication may be related to at least one of: a device manufacturer, a device vendor, a device model, and a software or firmware version. The network node may then be able to determine or produce the capability pointer based on the device information. For example, it may be known to the network node that a certain device model, or combination of any of the above device information, can be expected to support certain functions and features, which could be mapped to the capability pointer in question.

Thus, as an alternative to sending the capability pointer as such in "clear text", i.e. explicitly such as capability pointer "xx", the wireless device could instead send at least some of the above exemplified device information from which the pointer can be determined or derived. The network node could then combine these pieces of device information when producing the pointer and possibly add a preconfigured suffix to the pointer, e.g. "capabilities.3GPP.org", "<vendor>.com" or ".com". The network node may then e.g. obtain the associated capability configuration by performing a DNS (Domain Name System) lookup on the determined capability pointer. The device information can thus be regarded as an implicit indication of the capability pointer while the capability pointer in clear text can be regarded as an explicit indication of the capability pointer.

In a next action 302, the network node retrieves the capability configuration based on the capability pointer, which corresponds to action 2:2 above. In further possible embodiments, the network node may retrieve the capability configuration from a capability database located outside the network node, or from a local memory in the network node, as also mentioned above. A final action 304 illustrates that the network node uses the retrieved capability configuration in radio communication with the wireless device, which corresponds to action 2:3 above.

Some further embodiments that may be employed in the network node for the above-described procedure will now be mentioned. In one possible embodiment, the capability pointer may comprise multiple capability sub-pointers where each capability sub-pointer is related to a respective subset of capabilities in the capability configuration. Thereby, the network node is able to choose to retrieve and use only one subset (or a few subsets) of capabilities that is of interest, depending on the current situation and/or which service application is currently used by the device, based on the corresponding capability sub-pointer received from the device. This embodiment may thus be used to facilitate the retrieval of device capabilities since it is not necessary to retrieve the complete capability configuration which may, as said above, comprise much information.

In another possible embodiment, using the retrieved capability configuration may comprise determining whether a certain feature or function can be configured and used in the radio communication or not, based on the retrieved capability configuration. This determination may thus depend on whether the wireless device supports this feature or function or not. Furthermore, some communication services and features may require that a combination of several features and/or functions must be supported. For example, an on-line gaming service may require that the wireless device supports a certain bitrate or bandwidth, multiple carriers and also simultaneous transmission and reception.

In another example, the support of a feature X may imply that the wireless device supports features A, B and C, as well as capabilities F, G, and N. An example of this may be a new MAC entity that has been introduced to support very high bit rates which can be achieved, for example, if the wireless device supports carrier aggregation with 4 carriers, 128QAM modulation, plus some enhanced Multiple-Input-Multiple-Output, MIMO, scheme. If the wireless device indicates support of this MAC entity, the network also knows implicitly that the wireless device supports carrier aggregation up to 4 carriers, 128 QAM modulation, and the enhanced MIMO scheme. Based on this knowledge, the network is able to configure a subset of those features for the device and not the MAC entity.

In another possible embodiment, the retrieved capability configuration may comprise a list of functions and features that the wireless device supports. The retrieved capability configuration may further indicate whether each of said functions and features has been tested and verified or not. This embodiment may provide added flexibility since certain functions or features may be possible to employ even if they have not been tested and verified yet, e.g. depending on their characteristics and/or the current conditions in the network, while other functions or features may have to be tested and verified before they can be activated and employed. It may thus be up to the network to decide whether such a function or feature shall be employed or not. In this embodiment, the capability configuration associated with a specific capability pointer could contain a list of different capabilities with indications whether the capabilities are supported or not. The indications may be binary, e.g. feature X is supported (e.g. 1) or not (e.g. 0), or numerical depending on the capability, e.g. the number of antennas or carriers supported by the device is Y.

Figure 3:
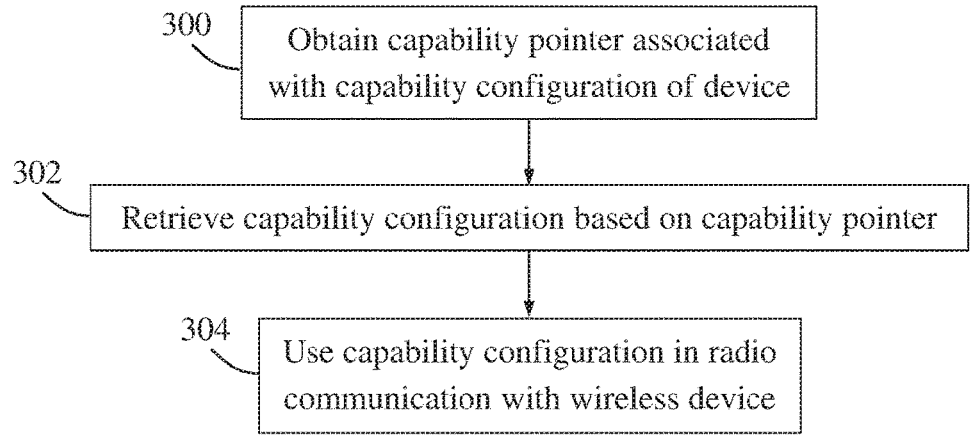
FIG. 3 is a flow chart illustrating a procedure in a network node, according to further possible embodiments.

The capability configuration retrieved by the network node in the procedure of FIG. 3 may include any type of information that is somehow related to how, and in which circumstances, the wireless device is capable of operating during radio communication, and some examples will now be briefly outlined. In one possible embodiment, the retrieved capability configuration may further indicate for which network conditions the functions and features have been tested and verified. Thereby, the network node may decide if it is suitable to activate a certain function or feature or not, given a current network condition.

In another possible embodiment, the retrieved capability configuration may comprise at least one specific feature or function supported by a certain radio network or by a certain device model. The information according to the latter two embodiments may be indicative of whether this feature or function can be activated and employed or not in the current circumstances. In another possible embodiment, the at least one specific feature or function as of the previous embodiment may be indicated by an information index in the retrieved capability configuration so that information about the at least one specific feature or function can be retrieved from a server based on the information index.

In further possible embodiments, the capability pointer may be a single information element or a combination of multiple information elements identifying at least one of a capability index, a device vendor, and a software or firmware version. For example, this embodiment may be implemented by means of a "proprietary information index" which could be an optional information element in the capability pointer. Some examples of such "sub" information elements will be described later below.

An example of how the solution may be employed in terms of actions in a procedure performed by a wireless device for handling capabilities in radio communication with a network node of a radio network, will now be described with reference to the flow chart in FIG. 4. This procedure can thus be used to accomplish the functionality described above, and some possible but non-limiting embodiments will also be described below. The wireless device in this example corresponds to the wireless device 202 of FIG. 2.

A first action 400 illustrates that the wireless device sends an indication of a capability pointer to the network node, which corresponds to actions 2:1 and 300 above. The capability pointer is associated with a capability configuration comprising capabilities of the wireless device, thereby enabling the network node to retrieve said capability configuration based on the capability pointer. Some examples of how the network node may retrieve the capability configuration have been described above.

In some other possible embodiments, the wireless device may send the indication of the capability pointer during establishment of a connection with the network node or in response to a capability enquiry received from the network node, which have also been mentioned above.

The indication of capability pointer of action 400 may be the capability pointer as such or some device information from which the capability pointer can be determined. It was described above that instead of sending the capability pointer as such in "clear text", the wireless device could send device information from which the pointer can be determined by the network node. In further possible embodiments useful in the procedure of FIG. 4, the indication of capability pointer may thus comprise device information which is related to at least one of: a manufacturer of the device, a device model, and a software or firmware version. Some examples of how such device information may be arranged and how it may be used by the network node to determine the capability pointer, have been described above.

In addition to action 400, the wireless device may perform some optional actions in accordance with further possible embodiments, which will now be described. A next action 402 illustrates that the wireless device may update its device capabilities, e.g. when the device has been upgraded and/or reconfigured in some way, or when a battery level in the device has changed. For example, if the battery level falls below a certain limit, the wireless device could indicate reduced capabilities, e.g. no support of carrier aggregation, in order to reduce the power consumption since using several carriers consumes more power than when a single carrier is used. Thus, the wireless device may in this action increase or reduce its capabilities e.g. depending on its current battery level, processor capacity, available memory space, etc.

If the wireless device has been reconfigured by added functionality, the resulting device capabilities may correspond to another capability configuration which is associated with a capability pointer that is different than the one used before by the wireless device. In a next action 404, the wireless device may therefore acquire an updated capability pointer associated with an updated capability configuration comprising the updated capabilities. A final action 406 illustrates that the wireless device sends an indication of the updated capability pointer to the network node. Thereby, the network node is enabled to retrieve the updated device capabilities from the new capability configuration based on the updated capability pointer, e.g. from the capability database 204 of FIG. 2.

In other possible embodiments, the capability pointer may be a single information element or a combination of information elements identifying at least one of a capability index, a device vendor, and a software or firmware version.

A non-limiting example of how a network node and a wireless device may be structured to bring about the above-described solution and embodiments thereof, will now be described with reference to the block diagram in FIG. 5. The network node 500 and the wireless device 502 may be configured to operate according to any of the examples and embodiments of employing the solution described above, where appropriate, and as follows. Each of the network node 500 and the wireless device 502 is shown to comprise a processor "P", a memory "M" and a communication circuit "C" with suitable equipment for transmitting and receiving radio signals in the manner described herein.

The communication circuit C in each of the network node 500 and the wireless device 502 thus comprises equipment configured for communication over a radio interface using a suitable protocol for radio communication depending on the implementation. The solution is however not limited to any specific types of messages or protocols. An example of such a communication was described above with reference to FIG. 2.

Figure 4:
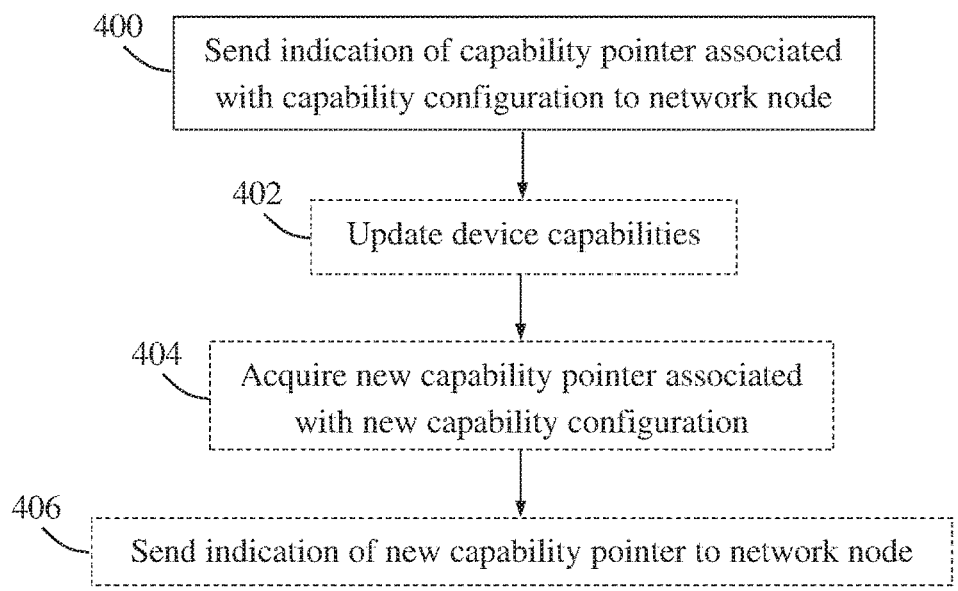
FIG. 4 is a flow chart illustrating a procedure in a wireless device, according to further possible embodiments.

The actions of FIGS. 3 and 4 may be performed by means of functional modules in the respective processors P in the network node 500 and the wireless device 502. For example, the network node 500 comprises means configured or arranged to perform the actions of the flow chart in FIG. 3 in the manner described above. Further, the wireless device 502 comprises means configured or arranged to perform at least action 400 and possibly also actions 402-406 of the flow chart in FIG. 4 in the manner described above.

The network node 500 is arranged to handle capabilities of a wireless device such as the device 502. The network node 500 thus comprises the processor P and the memory M, said memory comprising instructions executable by said processor, whereby the network node 500 is operative as follows.

The network node 500 is configured to obtain a capability pointer associated with a capability configuration comprising capabilities of the wireless device 502. This operation may be performed by an obtaining module 500A in the network node 500, e.g. in the manner described for action 300 above. The network node 500 is also configured to retrieve said capability configuration based on the obtained capability pointer. This operation may be performed by a retrieving module 500B in the network node 500, e.g. in the manner described for action 302 above.

The network node 500 is further configured to use the retrieved capability configuration in radio communication with the wireless device 502. This operation may be performed by a using module 500C in the network node 500, e.g. in the manner described for action 304 above. The using module 500C may alternatively be named communication module or implementing module.

The wireless device 502 is arranged to handle capabilities in radio communication with a network node of a radio network, such as the network node 500. The wireless device 502 comprises a processor P and a memory M, said memory comprising instructions executable by said processor whereby the wireless device 502 is operative as follows.

The wireless device 502 is configured to send an indication of a capability pointer to the network node 500, the capability pointer being associated with a capability configuration comprising capabilities of the wireless device 502. Thereby, the network node 500 is enabled to retrieve said capability configuration based on the capability pointer. This sending operation may be performed by a sending module 502A in the wireless device 502, e.g. in the manner described for action 400 above.

The wireless device 502 may also be configured to update the capabilities of the wireless device 502. This operation may be performed by an updating module 502B in the wireless device 502, e.g. in the manner described for action 402 above. The wireless device 502 may also be configured to acquire an updated capability pointer associated with an updated capability configuration comprising the updated capabilities. This operation may be performed by an acquiring module 502C in the wireless device 502, e.g. in the manner described for action 404 above. The wireless device 502 may further be configured to send an indication of the updated capability pointer to the network node 500, thereby enabling the network node 500 to retrieve the updated capability configuration based on the updated capability pointer. This operation may be performed by the sending module 502A, e.g. in the manner described for action 406 above.

Figure 5:
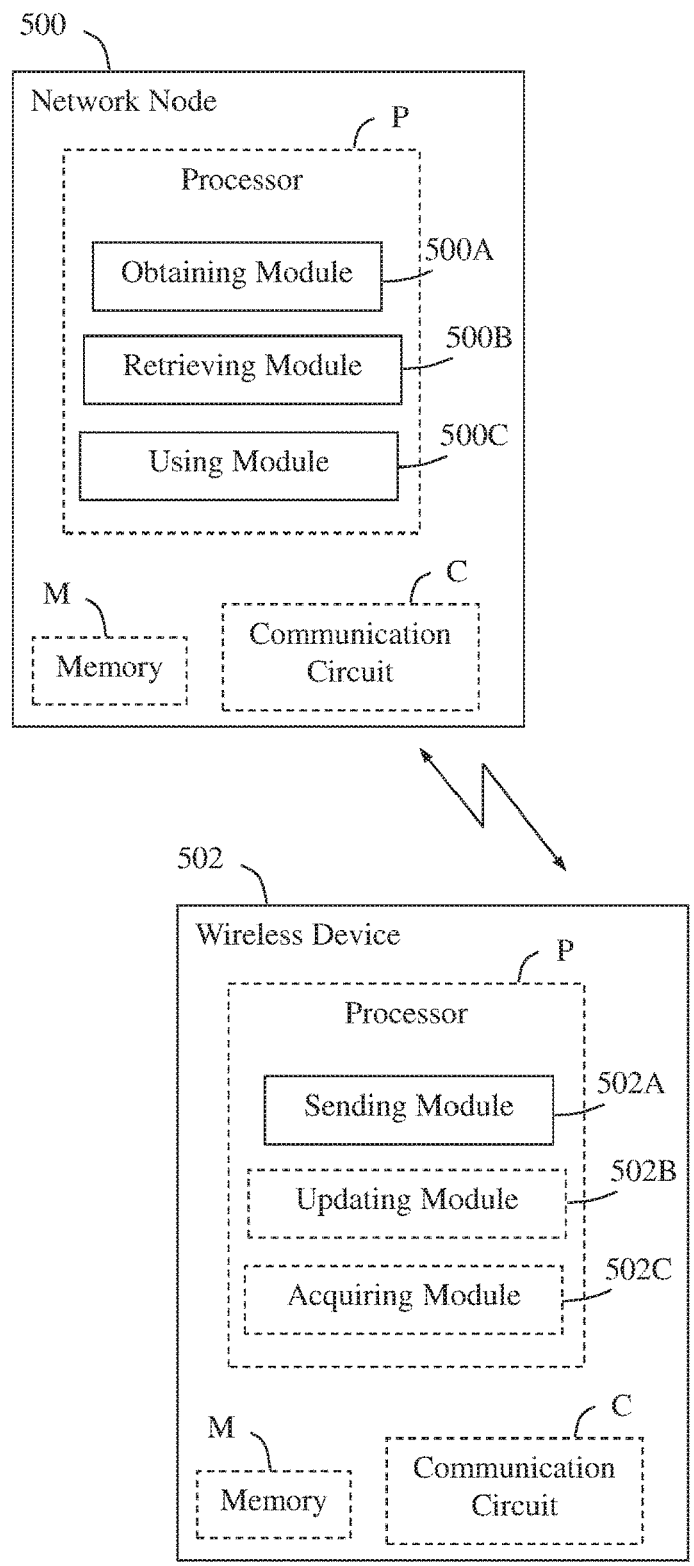
FIG. 5 is a block diagram illustrating a network node and a wireless device in more detail, according to further possible embodiments.

It should be noted that FIG. 5 illustrates various functional modules in the network node 500 and the wireless device 502, respectively, and the skilled person is able to implement these functional modules in practice using suitable software and hardware. Thus, the solution is generally not limited to the shown structures of the network node 500 and the wireless device 502, and the functional modules 500A-C and 502A-C therein may be configured to operate according to any of the features and embodiments described in this disclosure, where appropriate.

The functional modules 500A-C and 502A-C described above may be implemented in the network node 500 and the wireless device 502, respectively, by means of program modules of a respective computer program comprising code means which, when run by the processor P causes the network node 500 and the wireless device 502 to perform the above-described actions and procedures. Each processor P may comprise a single Central Processing Unit (CPU), or could comprise two or more processing units. For example, each processor P may include a general purpose microprocessor, an instruction set processor and/or related chips sets and/or a special purpose microprocessor such as an Application Specific Integrated Circuit (ASIC). Each processor P may also comprise a storage for caching purposes.

Each computer program may be carried by a computer program product in each of the network node 500 and the wireless device 502 in the form of a memory having a computer readable medium and being connected to the processor P. The computer program product or memory M in each of the network node 500 and the wireless device 502 thus comprises a computer readable medium on which the computer program is stored e.g. in the form of computer program modules or the like. For example, the memory M in each node may be a flash memory, a Random-Access Memory (RAM), a Read-Only Memory (ROM) or an Electrically Erasable Programmable ROM (EEPROM), and the program modules could in alternative embodiments be distributed on different computer program products in the form of memories within the respective network node 500 and the wireless device 502.

The solution described herein may be implemented in each of the network node 500 and the wireless device 502 by a computer program comprising instructions which, when executed on at least one processor, cause the at least one processor to carry out the actions according to any of the above embodiments, where appropriate. The solution may also be implemented at each of the network node 500 and the wireless device 502 in a carrier containing the above computer program, wherein the carrier is one of an electronic signal, optical signal, radio signal, or computer readable storage medium.

Figure 6:
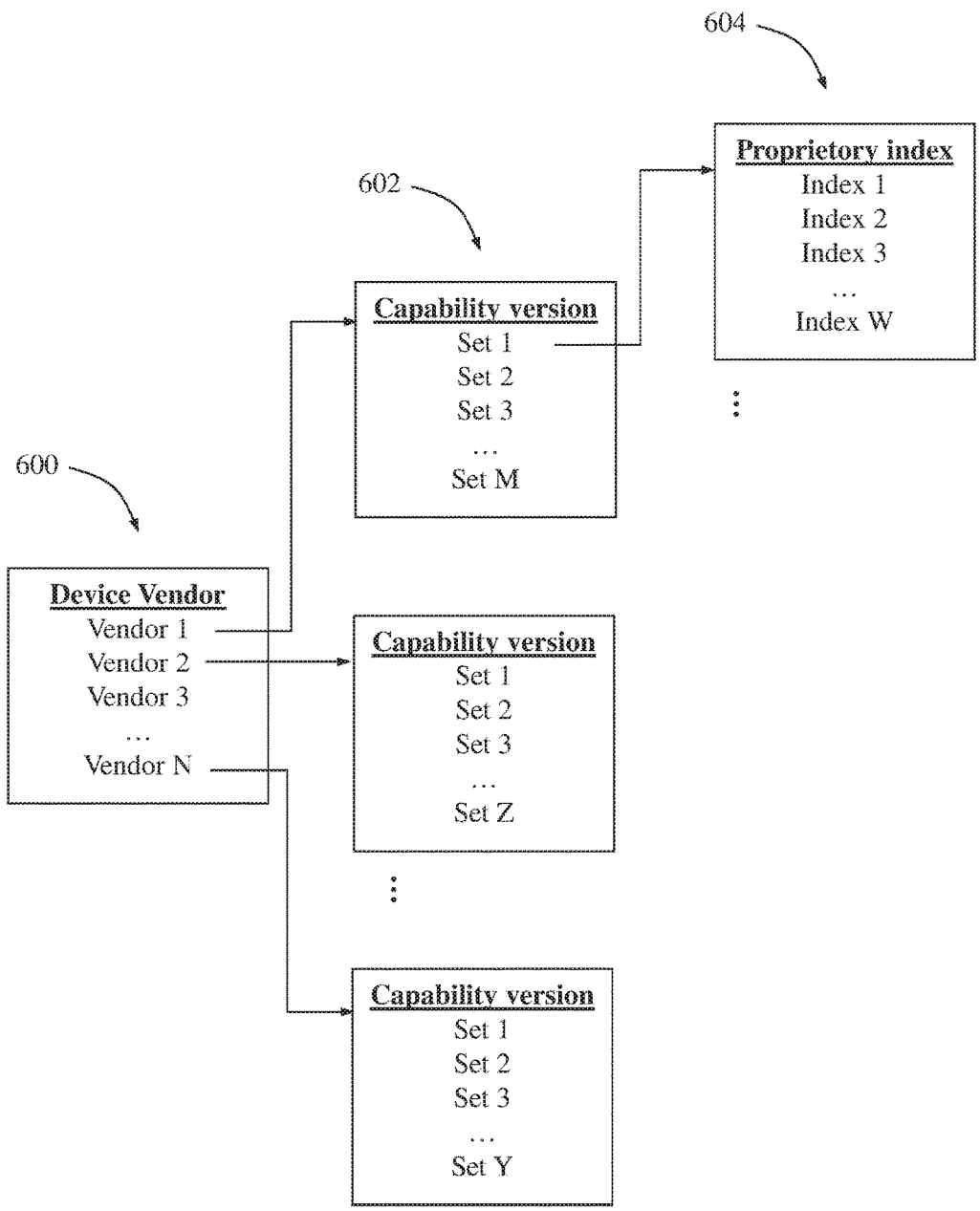
FIG. 6 is a schematic illustration of how a capability database may be structured, according to further possible embodiments.

It was mentioned above that the capability pointer may comprise multiple information elements, IEs, identifying at least one of a capability index, a device vendor, and a software or firmware version. FIG. 6 illustrates a non-limiting example of how a capability database may be organized and structured corresponding to such capability pointers with multiple IEs, to be useful in the above described procedures. The capability database may be implemented with data in an XML (Extensible Markup Language) format. In the example of FIG. 6, the capability database comprises capability configurations associated with respective capability pointers and the capability pointers are arranged in a hierarchical fashion according to different device vendors. Thus, the device vendors 1, 2, 3, . . . N are listed in a top level 600. In this example, "device vendor" is used as an IE of a capability pointer providing a category for structuring the capability database, although other categories could be used, alternatively or additionally, as a basis for the database structure such as device manufacturer, device model, or software/firmware version of the device.

Each device vendor in this example is associated to a specific capability version 602 specified by another IE in the capability pointer, where each capability version comprises different predefined sets of device capabilities, each set being thus a capability configuration associated with another IE of the capability pointer. Thus, device vendor 1 is associated to a first capability version comprising 1-M sets of device capabilities, device vendor 2 is associated to a second capability version comprising 1-Z sets of device capabilities, and so forth. The last device vendor N is associated to a capability version comprising 1-Y sets of device capabilities.

Furthermore, the sets of device capabilities defined for a certain capability version 602 may have a set of proprietary indexes 604, as indicated by another IE in the capability pointer, and device capabilities set 1 in the first capability version of vendor 1 is shown in this example to have a range of proprietary indexes 1-W. To conclude, a capability pointer may have multiple IEs including one IE specifying a device vendor, another IE specifying a capability version, another IE specifying a set of device capabilities, and a final IE specifying a proprietary index.

Some further possible examples and details regarding how the solution may be used in practice, will now be described.

As mentioned above, the capability configuration associated with a specific capability pointer could contain a list of different capabilities and indications of whether the wireless device supports the capabilities or not. The indications can be binary (e.g. feature X supported: yes or now) or numerical (e.g. the number of antennas supported) depending on the capability. Which capabilities should be part of the capability configuration and their possible values may preferably be standardized e.g. in a corresponding manner as the normal device capabilities sent over the radio interface in conventional procedures, in order to limit the number of possible capabilities to a reasonable amount. Too many capabilities could make the number of possible capability configurations very large which could impact network implementation complexity.

This should however not prevent that proprietary indications of support for proprietary (i.e. specific for a certain device vendor/manufacturer) features or capabilities may be included, as long as they can be ignored without harmful consequences. Then it would be up to network equipment vendors and operators to determine whether to support such proprietary features/capabilities or indications.

As mentioned above in the description of embodiments that can be used in the procedure of FIG. 3, it is possible to structure the capability pointer with multiple different sub-Information Elements (SIEs). These SIEs may identify at least one of a capability index, a device vendor, and a software or firmware version, and a proprietary information index could be an optional information element in the capability pointer. Some examples of such "sub" information elements will now be described in more detail.

For instance, the wireless device could signal a "capability pointer" IE compound of at least one IE, and optionally one or more additional IEs. The wireless device may determine the capability pointer itself from a set of SIEs or it may send the SIEs to the network node such that the network node may determine the capability pointer based on the SIEs sent from the wireless device. Some exemplary SIEs, denoted IE1-IE4, may be as follows.

1) IE1—"device vendor"

The device vendor IE could be specific for each device vendor and may be allocated by some numbering authority. It is also possible to have some generic device vendor IE in the capability pointer e.g. for a wireless device when it is not desirable to reveal its vendor IE, or for a wireless device which does not have a public capability configuration. In the latter case the network may need to request that the full capability configuration is transmitted from the wireless device to the network, which is however outside the solution described herein.

2) IE2—"Software/firmware version"—Optional IE

An IE indicating a software/firmware version of a wireless device would naturally be allocated by the vendor. This IE may optionally be included in the capability pointer to narrow down the scope of the device capability index (see below) and limit the database search among equipment from the same vendor.

3) IE3—"Device capability index"

This field "device capability index" could be used as a pointer to a set of capabilities with functions and features which the wireless device could support. Furthermore, this index could have a characteristic that it is common to several network vendors, meaning that different network vendors can refer to the same configuration, e.g. if they fulfill exactly the same device capabilities. Optionally, the device capability may have multiple indexes, each index identifying a set of device capabilities, wherein each such set of device capabilities is different from the other sets identified by the other indexes. The division into sets may e.g. be based on the categories of the device capabilities.

4) IE4—"Proprietary information index (List)"—Optional IE

The use of proprietary indexes 604 in capability pointers has been described above with reference to FIG. 6. The IE "Proprietary information index" is related to the capability index and it could contain none, one, or more indexes. The meaning of these indexes might not be publicly published or standardized, instead they could be used for device vendor specific features which may be used by the network vendors that have an agreement with the device manufacturer and/or have tested these device vendor specific features.

When the network node obtains a capability pointer with any of the above-described SIEs IE1-IE4, the network node may further send the IEs (possibly after some modification such as concatenation of the IEs with a dot as IE separator, forming a URL) to another entity/server which manages and/or compiles the device capabilities. For this entity, the term "server" will be used here for short which server may be implemented together with the above-mentioned capability database or elsewhere. The initial "device vendor" IE (optionally complemented by the "Software/firmware version" IE) could be used as a basis to decide to which server the information should be sent.

An entity that processes the "device capability information" could use the IE "device vendor", and possibly the optional "Software/firmware version" IE (if present), to filter the specific device/chipset vendor for which the device capabilities need to be retrieved. In case, the network uses the "device vendor" IE to decide to which server a request for device capabilities need to be sent, this IE may not be needed in the server receiving the request, apart from confirming that the request has been sent to the correct server.

Once the server knows the device vendor, it would (optionally) look at the "Software/firmware version" (if present) and thereafter look at the "device capability index" (or device capability indexes). This would point to a concrete capability configuration (or multiple partial capability configurations in case there are multiple indexes), which would typically be a list of all possible device capabilities and capability configurations.

If the IE "proprietary information index list" was included in the capability pointer, for the device vendor and corresponding capability index, the server receiving the request would retrieve any stored information related to the indexes indicated in the "proprietary information index list". The server could have knowledge of the vendor of the network which is requesting this information and could, instead of responding with all the information for each and all of the indexes in the list, send only the information related to the index which the network can decode. In case, the server does not have this information it would not be able to return any proprietary information to the network.

The proprietary information could be, for example, information related to features and functions that have been tested in that network, features which do not work properly, faults, and other relevant information not available in the device capability list indicated by the device capability index.

One aspect of the proprietary information is that the encoded information would only be understood by the network vendor which can understand the encoding.

All the relevant capability information identified by the server based on the capability pointer would be returned to the requesting network node. Thus, action 302 in FIG. 3, of retrieving the capability configuration based on the capability pointer, may involve the above-described procedure of sending the IEs of the capability pointer in a request to the server and receiving the relevant device capabilities in response thereto.

The capability pointer may further be encrypted and/or signed with some Public Key Certificate verified by some authentication authority. In order to save bits, this encryption may be enabled by the network only when needed or desired. It may be expected that the wireless device will send the capability pointer over an encrypted radio connection only to a network with which it has been authenticated to communicate. So from this point of view the capability pointer cannot easily be intercepted by other parties than the network, and cannot thus be used by other parties for tracking individuals based on knowledge about their devices.

When using any of the above-described embodiments and examples of the proprietary information index in capability pointers, it is also possible to prevent other networks from finding out what the proprietary information index means, since the node knowing this information will only provide it to the networks that are allowed to know this information.

While the solution has been described with reference to specific exemplifying embodiments, the description is generally only intended to illustrate the inventive concept and should not be taken as limiting the scope of the solution. For example, the terms "network node", "wireless device", "capability pointer", "capability configuration", "device information" and "capability database" have been used throughout this disclosure, although any other corresponding entities, functions, and/or parameters could also be used having the features and characteristics described here. The solution is defined by the appended claims.

The invention claimed is:

1. A method performed by a network node of a radio network, for handling capabilities of a wireless device, the method comprising:
obtaining a capability pointer associated with a capability configuration comprising capabilities of the wireless device, wherein the capability pointer comprises multiple capability sub-pointers where each capability sub-pointer is related to a respective subset of capabilities in the capability configuration;
retrieving said capability configuration based on the capability pointer, wherein the retrieved capability configuration comprises a list of functions and features that the wireless device supports, the retrieved capability configuration further indicating whether each of said functions and features has been tested and verified or not, the retrieved capability configuration further indicating for which network conditions the functions and features have been tested and verified; and
using the retrieved capability configuration in radio communication with the wireless device.

2. The method of claim 1, wherein obtaining the capability pointer comprises receiving the capability pointer from the wireless device during establishment of a connection with the wireless device or in response to a capability enquiry transmitted to the wireless device.

3. The method of claim 1, wherein obtaining the capability pointer comprises receiving an indication of the capability pointer from the wireless device, the indication comprising device information pertaining to said wireless device, and determining the capability pointer based on the device information, wherein the device information is related to at least one of: a device manufacturer, a device vendor, a device model, and a software or firmware version.

4. The method of claim 1, wherein using the retrieved capability configuration comprises determining whether a certain feature or function can be configured and used in the radio communication or not, based on the retrieved capability configuration.

5. The method of claim 1, wherein the retrieved capability configuration comprises at least one specific feature or function supported by a certain radio network or by a certain device model.

6. The method of claim 5, wherein said at least one specific feature or function is indicated by an information index in the retrieved capability configuration to enable retrieval of information about the at least one specific feature or function from a server based on the information index.

7. The method of claim 1, wherein the capability configuration is retrieved from a capability database outside the network node or from a local memory in the network node.

8. The method of claim 1, wherein the capability pointer is a single information element or a combination of information elements identifying at least one of a capability index, a device vendor, and a software or firmware version.

9. A network node arranged to handle capabilities of a wireless device, the network node comprising a processor and memory, wherein the processor and memory are configured to:
obtain a capability pointer associated with a capability configuration comprising capabilities of the wireless device, wherein the capability pointer comprises multiple capability sub-pointers where each capability sub-pointer is related to a respective subset of capabilities in the capability configuration,
retrieve said capability configuration based on the capability pointer, wherein the retrieved capability configuration comprises a list of functions and features that the wireless device supports, the retrieved capability configuration further indicating whether each of said functions and features has been tested and verified or not, the retrieved capability configuration further indicating for which network conditions the functions and features have been tested and verified; and
use the retrieved capability configuration in radio communication with the wireless device.

10. The network node of claim 9, wherein the processor and memory are configured to receive the capability pointer from the wireless device during establishment of a connection with the wireless device or in response to a capability enquiry transmitted to the wireless device.

11. The network node of claim 9, wherein the processor and memory are configured to obtain the capability pointer by receiving an indication of the capability pointer from the wireless device, the indication comprising device information pertaining to said wireless device, and by determining the capability pointer based on the device information, wherein the device information is related to at least one of: a device manufacturer, a device vendor, a device model, and a software or firmware version.

12. The network node of claim 9, wherein the processor and memory are configured to determine whether a certain feature or function can be configured and used in the radio communication or not, based on the retrieved capability configuration.

13. The network node of claim 9, wherein the retrieved capability configuration comprises at least one specific feature or function supported by a certain radio network or by a certain device model.

14. The network node of claim 13, wherein said at least one specific feature or function is indicated by an information index in the retrieved capability configuration to enable retrieval of information about the at least one specific feature or function from a server based on the information index.

15. The network node of claim 9, wherein the processor and memory are configured to retrieve the capability configuration from a capability database outside network node or from a local memory in the network node.

16. The network node of claim 9, wherein the capability pointer is a single information element or a combination of information elements identifying at least one of a capability index, a device vendor, and a software or firmware version.

17. A method performed by a wireless device for handling capabilities in radio communication with a network node of a radio network, the method comprising:
- sending an indication of a capability pointer to the network node, the capability pointer being associated with a capability configuration comprising capabilities of the wireless device, thereby enabling the network node to retrieve said capability configuration based on the capability pointer, wherein the capability pointer comprises multiple capability sub-pointers where each capability sub-pointer is related to a respective subset of capabilities in the capability configuration;
- updating the capabilities of the wireless device;
- acquiring an updated capability pointer associated with an updated capability configuration comprising the updated capabilities, and
- sending an indication of the updated capability pointer to the network node, thereby enabling the network node to retrieve the updated capability configuration based on the updated capability pointer.

18. The method of claim 17, wherein the wireless device sends the indication of the capability pointer during establishment of a connection with the network node or in response to a capability enquiry received from the network node.

19. The method of claim 17, wherein the indication of capability pointer comprises device information to enable determination from which of the capability pointer from the device information can be determined, the device information being related to at least one of:
- a manufacturer of the device, a device model, and a software or firmware version.

20. The method of claim 17, wherein the capability pointer is a single information element or a combination of information elements identifying at least one of a capability index, a device vendor, and a software or firmware version.

21. A wireless device arranged to handle capabilities in radio communication with a network node of a radio network, the wireless device comprising a processor and memory configured to:
- send an indication of a capability pointer to the network node, the capability pointer being associated with a capability configuration comprising capabilities of the wireless device, thereby enabling the network node to retrieve said capability configuration based on the capability pointer, wherein the capability pointer comprises multiple capability sub-pointers where each capability sub-pointer is related to a respective subset of capabilities in the capability configuration;
- update the capabilities of the wireless device;
- acquire an updated capability pointer associated with an updated capability configuration comprising the updated capabilities, and
- send an indication of the updated capability pointer to the network node, thereby enabling the network node to retrieve the updated capability configuration based on the updated capability pointer.

22. The wireless device of claim 21, wherein the processor and memory are configured to send the indication of the capability pointer during establishment of a connection with the network node or in response to a capability enquiry received from the network node.

23. The wireless device of claim 21, wherein the indication of capability pointer comprises device information to enable determination of the capability pointer from the device information, the device information being related to at least one of: a manufacturer of the device, a device model, and a software or firmware version.

24. The wireless device of claim 21, wherein the capability pointer is a single information element or a combination of information elements identifying a device vendor and a capability index.

* * * * *